United States Patent [19]

Keener et al.

[11] Patent Number: 5,274,319
[45] Date of Patent: Dec. 28, 1993

[54] RECHARGEABLE BATTERY MANAGER

[76] Inventors: Thomas Keener, 875 Waimanu St., #632, Honolulu, Hi. 96813; W. Joe Watson, 3005 Broken Bow Rd., Edmond, Okla. 73013

[21] Appl. No.: 953,107

[22] Filed: Sep. 29, 1992

Related U.S. Application Data

[63] Continuation-in-part of Ser. No. 895,331, Jun. 8, 1992.

[51] Int. Cl.$^5$ ............................................. H02J 7/00
[52] U.S. Cl. ........................................... 320/2; 320/5; 320/22
[58] Field of Search ................... 320/2, 5, 6, 14, 15, 320/22, 23, 24

[56] References Cited

U.S. PATENT DOCUMENTS

| | | | |
|---|---|---|---|
| 3,454,859 | 7/1969 | Ford et al. | 320/6 |
| 3,992,658 | 11/1976 | Bechtold et al. | 320/20 |
| 4,048,551 | 9/1977 | Bosik | 320/21 |
| 4,084,124 | 4/1978 | Kapustka | 320/9 |
| 4,179,648 | 12/1979 | Samsioe | 320/23 X |
| 4,302,714 | 11/1981 | Yefsky | 320/5 |
| 4,342,954 | 8/1982 | Griffith | 320/14 |
| 4,413,221 | 11/1983 | Benjamin et al. | 320/14 X |
| 4,424,476 | 1/1984 | Mullersman | 320/36 |
| 4,628,243 | 12/1986 | Hodgman et al. | 320/2 |
| 4,695,784 | 9/1987 | Reynolds | 320/32 |
| 4,710,694 | 12/1987 | Sutphin et al. | 320/24 X |
| 4,737,702 | 4/1988 | Koenck | 320/5 X |
| 4,742,289 | 5/1988 | Wahlstrom | 320/14 |
| 4,767,977 | 8/1988 | Fasen et al. | 320/20 |
| 4,806,840 | 2/1989 | Alexander et al. | 320/20 |
| 4,829,225 | 5/1989 | Podrazhansky et al. | 320/14 |
| 4,965,507 | 10/1990 | Smilanich et al. | 320/22 X |
| 5,111,128 | 5/1992 | Branan, Jr. et al. | 320/2 |
| 5,164,652 | 11/1992 | Johnson et al. | 320/2 |

*Primary Examiner*—Kristine L. Peckman
*Attorney, Agent, or Firm*—James Creighton Wray

[57] ABSTRACT

An apparatus and method for conditioning batteries incorporates a programming device having different signatures for batteries of different characteristics. When a battery is to be conditioned, one of the programming devices representing the characteristics of that battery is attached to the battery and the combined battery/programming device is positioned on the battery conditioner. A surface of the conditioner contains a reading device that reads the signature of the programming device and automatically programs the discharging/charging circuits to provide a discharge/charge sequence that is tailored to the particular characteristics of the battery being conditioned. Programming devices can include mechanical complementary protrusions and apertures, bar codes, magnetic strips, magnetic spots with Hall-Effect readers, electrical parameters, built-in wire coding, and other suitable complementary signatures and readers.

32 Claims, 3 Drawing Sheets

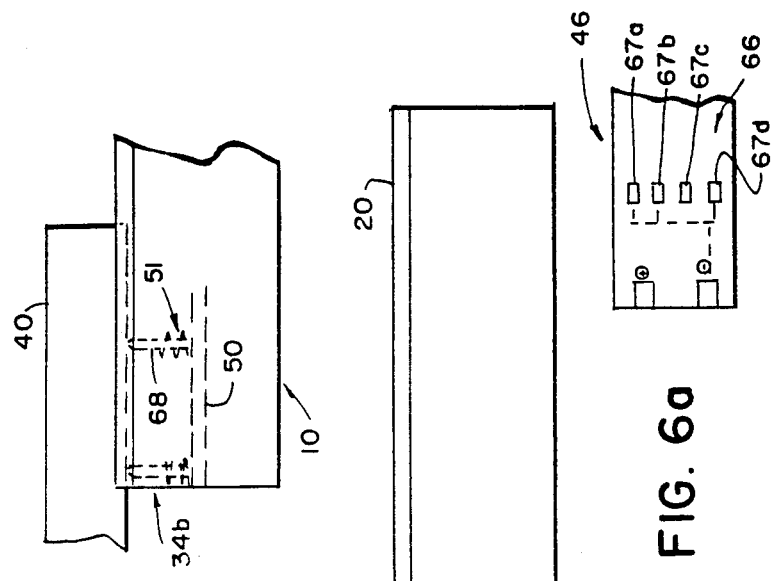
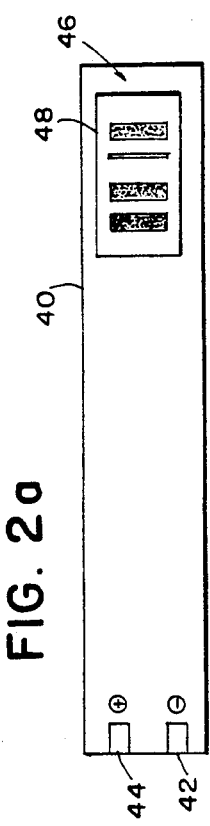
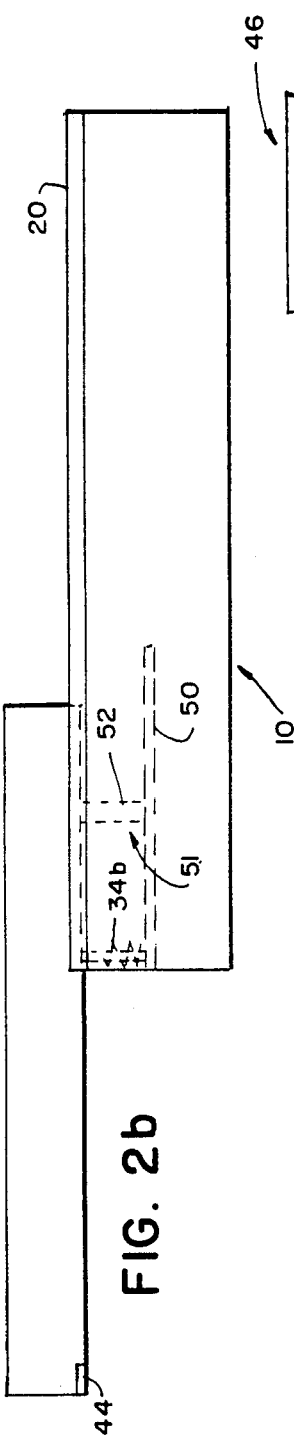
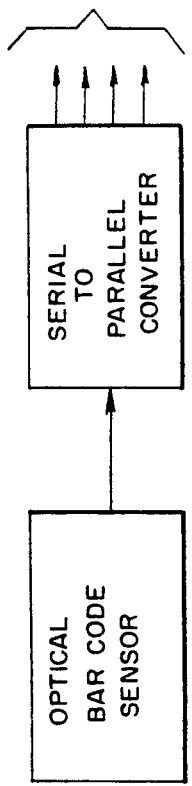
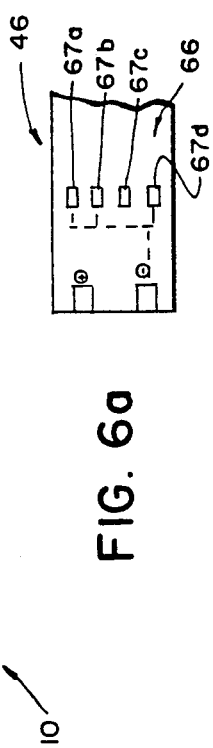
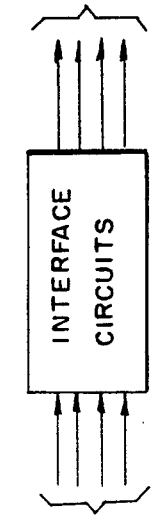

RECHARGEABLE BATTERY MANAGER

This application is a continuation-in-part of application Ser. No. 895,331 filed Jun. 8, 1992.

BACKGROUND OF THE INVENTION

This invention relates to battery charging, and more particularly to a managed profile and facilitated programming of battery discharging and recharging so as to extend useful lifetimes and maintain service capacities of batteries which tend to develop undesirable "memory" characteristics.

Various types of batteries require differing profiles of battery charging/discharging if they are to provide dependable service and optimum service life. For example, lead-acid batteries commonly employed in automobiles retain optimal service life and characteristics best when maintained essentially fully charged. Such batteries suffer degradation and service life characteristics when they are subjected to deep discharge. Conversely, other types of rechargeable batteries tend to maintain optimal characteristics only if during each charge/discharge cycle they are deeply discharged. Examples of such batteries are those of the popular nickel cadmium variety.

Nickel cadmium batteries, if recharged after only partial discharge, tend to experience deterioration in their total charging capability. Thus, after several such cycles, a nickel cadmium battery will typically retain substantially less than its originally rated number of ampere hours, a result that is generally considered to be disadvantageous and to be avoided when practicable. However, it has been the practice in the past for battery users to oftentimes substitute a fresh battery for one which has had some use prior to full discharge so as to avoid experiencing complete loss of battery power during an extended period of use, thereby introducing the danger of adversely impacting subsequent battery characteristics of the only partially discharged battery.

To overcome the potentially deleterious results of repeatedly recharging batteries such as nickel cadmium batteries after only partial discharge, prior art proposals include the intentional deep discharge of any charge remaining in the battery as part of the recharging process. Illustrative of such a procedure are the proposals of U.S. Pat. Nos. 4,179,648, granted to Edward Samsioe on Dec. 18, 1979, and 4,302,714 to Sheldon Yefsky on Nov. 24, 1981.

Although these proposals were directed generally to the solution of the aforementioned problems, there still existed the matter of setting discharge and recharging conditions to tailor them to optimum levels for any of a variety of battery sizes and current ratings. One proposal includes the tailored conditioning of the equipment parameters to reflect the specific characteristics of a battery by providing for the manual setting of dip switches. However, such have been subject to the undesirable consequences of setting errors, switch malfunction, or loss of instructions for switch setting.

As well as nickel cadmium batteries, other batteries such as metal hydride batteries are currently being developed. There exists a need for a conditioning system which not only recognizes various sizes and current ratings of certain batteries, but also recognizes and conditions batteries of different compositions.

SUMMARY OF THE INVENTION

The inventive proposals hereof overcome the above-described disadvantages by providing a programmed intentional discharge for each battery according to the level of discharge required to achieve what is generally known as "deep discharge". Thus, each battery that is positioned in the recharger for recharging is first deeply discharged so that the above-described adverse memory characteristic does not significantly degrade battery characteristics. This is accomplished while avoiding reverse polarization. Further, the present invention is able to recognize various sizes and specifications within a certain battery class, as well as differing types of batteries, and to condition the batteries accordingly. The battery is fully recharged according to a programmed charging schedule which is specifically adapted to the type and capacity of the battery involved, thereby providing an optimal management of the discharge and charge cycle.

A battery conditioner provides a plurality of differing programming means representing a plurality of batteries of differing characteristics. The programming means includes a signature tailored to the characteristics of each of the batteries for automatically programming the battery conditioner to supply to the batteries individually programmed optimal levels of charge. An attaching means attaches the programming means to the batteries to match each of the batteries with the one of the programming means tailored to the characteristics of the batteries. A housing is adapted to individually receive the battery and attached programming means. The housing includes electrical circuits for discharging and recharging the batteries. A sensing means is associated with the housing for sensing the presence of one of the programming means. The battery conditioner has an electrical connection between battery terminals and the housing. Control means, including the sensing means and the electrical connection, recognize the signature of the programming means and discharging the connected battery to a voltage level tailored to the voltage characteristics of the connected battery, and then automatically recharge the connected battery to a predetermined programmed level according to the programming means.

In one embodiment, the programming means is an optical signature and the sensing means is an optical reader. A preferred optical signature is a bar code and a preferred optical reader is a bar code reader.

Alternatively the programming means is an information-bearing magnetic strip, and the sensing means is a magnetic strip reader.

A preferred programming means is an electrical component specifically providing a signature for the type of battery, and the sensing means is an electrical sensing device for reading the specific characteristics of the electrical component.

In another preferred embodiment, electrical component is an internal resistor and the electrical reader measures the specific voltage drop through the resistor. At least one additional battery terminal can be connected to the resistor and complementary sensing battery pins can be connected to the sensing means for measuring the voltage drop within the resistor. The resistor presents a specific voltage drop which is a signature to the type of battery being conditioned. Preferably, an A-D converter is provided within the conditioner circuitry for converting the voltage through the resistor to digital data for supplying information to the conditioner circuitry to identify the type of battery being specified by the programming means.

In an alternative preferred embodiment, the programming means is a built-in wired code of parameters specific to the type of battery, and the sensing means are contacts provided complementary to the wired code for reading the specific type of battery. The wired code may incorporate a plurality of contacts being either grounded or ungrounded according to the specific signature of the battery, wherein the sensing means and control means recognize a pattern of grounded or ungrounded contacts in association with the type of battery being conditioned.

The electrical circuits discharge and recharge the batteries and establish a selected predetermined group of different discrete charging levels. Preferred discrete charging levels may have distinct voltages and current. The programming means automatically selects a predetermined one of the discrete charging levels. In a preferred battery conditioner, the programming means automatically selects a predetermined one of the constant current charging levels.

In one embodiment, the attaching means is a metal plate with an adhesive. In another embodiment, the attachment means is a permanent attachment between the battery and programming means which is provided during manufacture.

Preferred sensing means senses the presence of one of the programming means by making electrical contact with two of the programming means.

In a preferred embodiment, the housing includes on the exterior thereof at least two rails for receiving and holding the battery in contact with the conditioner. The control means is activated to initiate discharging and recharging only after a predetermined delay following the sensing of the presence of one of the programming means.

A method of conditioning a battery includes providing a programming means having a specific signature specifying a type of battery in conjunction with a battery. A battery conditioner is provided with a sensing means which is complementary to the programming means and can read the signature of the battery. The signature of the battery is read, identifying characteristics of the predetermined type of battery, and automatically programming the battery conditioner to condition the battery according to the characteristics of the predetermined type of battery. The battery conditioner is activated when the characteristics of the predetermined type of battery are identified to condition the battery according to its characteristics.

Preferably, conditioning the battery according to the characteristics further includes discharging the battery until the electrical potential at the terminals of the battery is equal to or less than a predetermined level. Further, conditioning the battery according to the characteristics also includes charging the battery at a predetermined constant current level during a predetermined period of time.

The step of conditioning the battery according to the electrical characteristics preferably includes discharging the battery until the electrical potential at the terminals of the battery is equal to or less than a predetermined level; and charging the battery at a predetermined constant current level during a predetermined period of time.

A primary object of the present invention is to provide a system which recognizes a battery class and subclass and conditions the battery accordingly.

Another object of the invention is to provide a programming means for batteries which provides a signature for a type of battery and which is compatible with a reading means on the conditioner.

It is one general object of this invention to improve performance of nickel cadmium and metal hydride batteries It is another object of the invention to facilitate discharge and recharging of such batteries.

Another object of the invention is to provide a conditioning system which is adaptable and programmable to battery technologies as they are developed.

It is still another object of the invention to facilitate tailoring of the discharge/charge parameters to the specific characteristics of such batteries.

Accordingly, in accordance with one feature of the invention, nickel cadmium and other metal hydride batteries are subjected to intentional deep discharge by the improved apparatus hereof and then subjected to complete automatically programmed recharge, thereby simplifying the optimizing the charging of the battery. Metal hydride batteries ar re-charged without initial deep discharge.

In accordance with another feature of the invention, other types of batteries require varying quantities of discharge/recharge. The present conditioning system recognizes the batteries' signatures and conditions the batteries accordingly.

In accordance with another feature of the invention, improved means for battery identification by the charger are provided, thereby simplifying identification and facilitating selective conditioning according to the particular characteristics of the battery involved.

In accordance with still another feature of the invention, the aforementioned battery identification means are adapted to automatically program simple battery conditioning control circuits, thereby facilitating conditioning programs tailored to the particular characteristics of any of a selected variety of batteries.

These and further and other objects and features of the invention are apparent in the disclosure, which includes the above and ongoing written specification, with the claims and the drawings.

BRIEF DESCRIPTION OF THE DRAWINGS

FIG. 2a shows a frontal view of a battery with an attached bar code programming label.

FIG. 2b is a side view showing the battery being inserted into the Battery Manager, wherein the manager incorporates an optical bar code sensor for reading the signature of the bar code label and conditioning the battery accordingly.

FIG. 2c provides the flow of information from the optical sensor to the Battery Manager circuitry.

FIGS. 6a, 6b and 6c provide a built-in wire code within the battery to be conditioned, wherein the Battery Manager incorporates battery pins connected to the circuitry for reading the signature and conditioning accordingly.

DETAILED DESCRIPTION OF THE DRAWINGS

Figure 1:
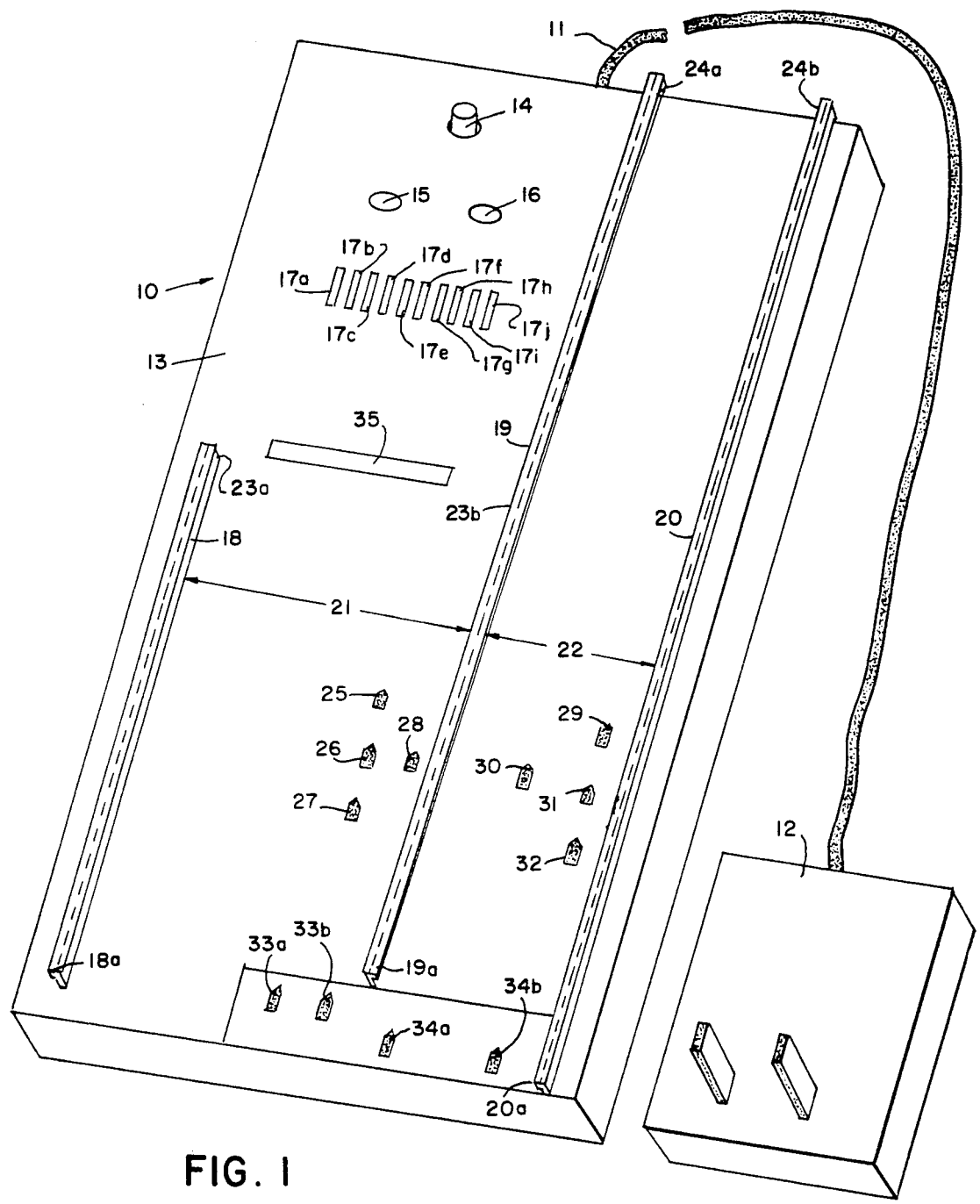
FIG. 1 is a perspective view depicting the improved rechargeable batter manager, having mechanical programming and reading means.

In FIG. 1, a Battery Manager generally indicated by the numeral 10 has a conventional power cord 11 which connects to a conventional step down transformer 12. In a preferred embodiment, the transformer produces about 16.5 volts a-c and has a current capacity of 600 milliamperes or more.

The upper face 13 includes a recycle push button 14, a charge light 15 and a discharge light 16.

A plurality of battery voltage level indicators are provided below the charge and discharge lights 15 and 16. These are preferably light-emitting diodes 17a–17j. The diodes indicate the level of charge which exists on the battery at any given time. A nameplate, which is designated in FIG. 1 with the applicant's trademark Cell-U-Life, can be provided on the Battery Manager 10. A plurality of rails 18, 19 and 20 are disposed on the upper face 13 of the Battery Manager 10. The rails are positioned to engage mating geometries of the batteries such as those available from the Motorola Company for use with their cellular telephones. Thus, the distance between rails 18 and 19 shown as dimension 21 is essentially equal to the corresponding dimension of a wide family of batteries. On the other hand, the physical distance 22 between rails 19 and 20 corresponds to the corresponding width dimensions between mating geometries of a narrower family of such batteries. The rails can also be adjustable to accommodate various batteries, or other suitable battery engagement means may be employed.

In a preferred embodiment, the guide rails 18, 19 and 20 include longitudinal lips 18a, 19a and 20a for receiving and mating with the corresponding surfaces of mating battery geometries, and any of a variety of conventional stops such as battery stop projection 35 may preferably be included near positions 23a–23b for use in seating the wider batteries and at locations 24a and 24b for the narrower batteries.

The Battery Manager incorporates reading means for reading the signature programming means, which is provided on or is incorporated into the engaged battery. In one embodiment as described in the parent application of this invention, mechanical reading and programming means are provided.

As shown in FIG. 1, projecting upwardly through the upper surface 13 of the Battery Manager 10 are a plurality of depressible spring loaded, conically topped programming pins 25–32. These pins are connected into the electrical circuits so as to distinguish between the characteristics of the different batteries that may be utilized with the Battery Manager and operate in accordance with the description of the circuits set forth below.

Also projecting upwardly through the upper face 13 of Battery Manager 10 are two pairs of conically topped, spring loaded electrical contacts 33a–33b and 34a–34b. These pairs of electrical contacts are provided to make electrical contact directly with the positive/negative terminals of the batteries so as to provide for discharging and charging therethrough. Accordingly, when one of the batteries is deployed in position so that its programming plate is deployed into the correct position, appropriate electrical contacts are also made through contacts 33a–33b or 34a–34b with the battery terminals.

The Battery Manager incorporates a programming means which provides a signature for a specific type of battery. The programming means may be built into the battery during manufacture, or the Battery Manager can be sold with metal plates or other adhesive indicators to be provided on or with the battery to be conditioned.

The Battery Manager incorporates a reading means which is complementary to the programming means. Preferred programming means include mechanical pins and apertures as provided in the co-pending parent application, bar codes, magnetic strips and dots, built-in electrical resistors, and built-in electrical contact areas. In turn, the Battery Manager incorporates the complementary readers suitable for reading these signature items. It is not beyond the scope of the present invention to incorporate more than one type of reader on a single Battery Manager.

In FIGS. 2a–2c, a preferred Battery Manager incorporates programming and reading means 46 and 51, which are sensed optically. In FIG. 2a, a bar code 48 is either printed onto the battery or on a label affixed to the battery. An optical scanner 52 within the Battery Manager 10 is the reading means 51. When the battery is inserted, as shown in FIG. 2b, the bar code can be scanned by the optical sensor serially, or it can be sensed in parallel after insertion. The battery terminals 44 and 42 are coupled with the battery pins 34a and 34b to be charged according to the information conveyed on the bar code 48. The scanner 52 is attached to a circuit board 50, which identifies the battery class and type and conditions the battery accordingly.

In FIG. 2c, if serial scanning is used, digital signals from the optical sensor are converted into parallel digital code. The resultant parallel digital code uniquely identifies the battery type and establishes the appropriate discharge/charge battery conditioning profile.

Figure 3A:
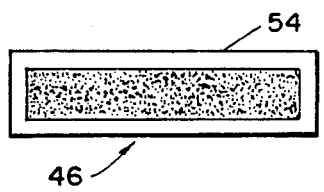
FIG. 3a and 3b show a front view of the battery incorporating a magnetic strip and insertion of the battery into the Battery Manager.
Figure 3B:
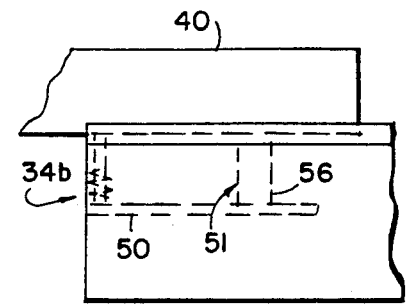

In an alternate preferred embodiment as shown in FIGS. 3a and 3b, the programming means 46 is a magnetic strip 54, and the reading means 51 is a magnetic sensing means 56. The magnetic strip 54 is affixed to the battery and contains a digital code unique to the battery type. When the battery is inserted, the magnetic strip is sensed by the magnetic strip sensor 56. The serial digital signals from the magnetic strip sensor are converted to parallel digital code, which uniquely identifies the battery type and establishes the appropriate discharge/charge battery conditioning profile.

Figure 4A:
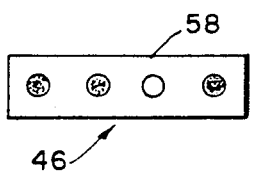
FIGS. 4a and 4b show a top view of the battery incorporating a series of magnetic spots and insertion of the battery into the Battery Manager which incorporates a Hall-Effect sensor for reading the magnetic spots.
Figure 4B:
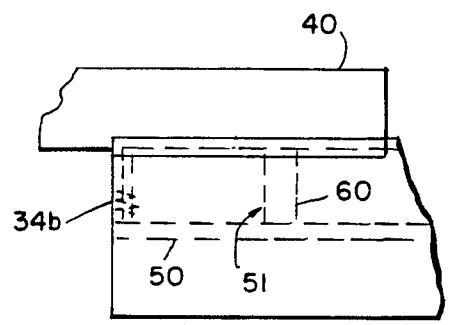

In FIGS. 4a and 4b, the programming means 46 are magnetic spots 58 affixed to the battery. The spots 58 represent digital code unique to the battery type. When the battery is inserted, the magnetic spots can be serially sensed using a Hall-Effect semiconductor device 60 as the sensor or reading means 51. In an alternative embodiment, the spots 58 can be sensed in parallel after the battery has been inserted by a plurality of Hall-Effect semiconductor devices 60, wherein one device is used to sense each magnetic spot. Whether sensed serially or in parallel, a parallel digital code is provided to the Battery Manager circuit 50, which uniquely identifies the battery type and establishes the appropriate discharge/charge battery conditioning profile.

Figure 5A:
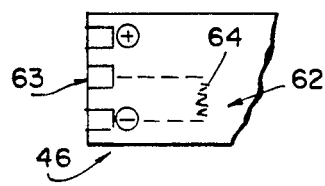
FIGS. 5a, 5b and 5c show the integration of an internal resistor within the battery, wherein the resistor is specific to the type of battery to be conditioned, and the Battery Manager is programmed to read the signature resistance and condition the battery accordingly.
Figure 5B:
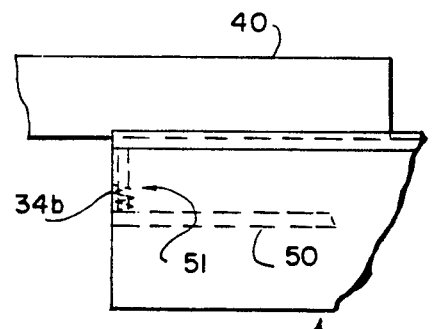
Figure 5C:
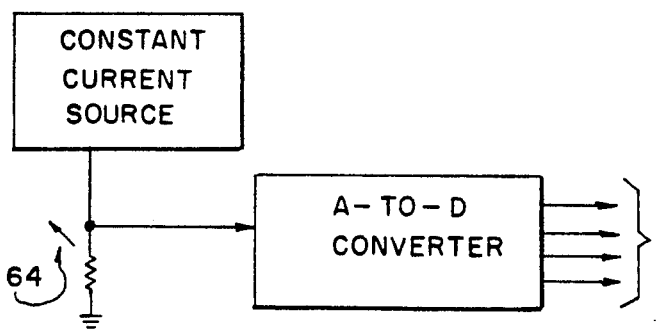

In an alternate preferred embodiment, as shown in FIGS. 5a, 5b and 5c, an electrical component 62 having specific characteristics which provide a signature for the class and/or type of battery is the programming means 46. In a preferred embodiment, an extra battery terminal 63 can be provided, and an internal resistor 64 specific to a certain type of battery can be attached to the existing terminal and the extra battery terminal. The reading means 51 can be a suitable reading means complementary to the resistor or other electrical component, and is provided on the Battery Manager to read the component signature when the battery is inserted. For a relatively small number of battery types, the resistance values could be widely separated and, hence, easily measured for identifying battery types. The measurement by the reading means 51 includes passing a current through the resistor, establishing a corresponding voltage drop, and then converting this voltage to a digital representation in the circuitry 50 using a simple A-D converter. This can be done using a resistor ladder network or a single integrated circuit. The resulting digital code is provided to the Battery Manager circuit, uniquely identifying the battery type and conditioning accordingly. The contacts or terminals 63 can be provided at the end or in other suitable areas.

Alternate preferred complementary programming and reading means is shown in FIGS. 6a and 6b. A wired code 66 is the programming means 46 and is built into the battery with extra battery terminals. The battery manufacturer would specify these during manufacturer, giving each type and class a signature wiring code. For example, the wiring code 66 in FIG. 6a could have code terminals 67a-67d, which are variously grounded or not grounded according to the signature of the battery type. The code pins 68 in the Battery Manager are the sensing means 51, which read the code terminals 67a-67d to determine the specific wire coding defining the type of battery. The code is transferred to the circuit, and the manager conditions the battery according to the specifications as built in by the manufacturer.

While several types of programming and complementary reading means have been specified, it is not beyond the scope of the present invention to have other suitable programming and complementary reading means. For example, more complex devices such as computer chips can be built into the battery and read using an appropriate reading means in the Battery Manager. The method of providing a unique code for a battery type and conditioning a battery according to its type is a novel, primary function of the present invention.

When a battery is engaged and the programing means is coupled to the reading means, connections are made from the plus and minus terminals of the battery to the discharge/charging circuits. A description of the circuitry needed to read the programming means and subsequently condition the battery is provided in the parent application, although other suitable circuits may be provided without varying from the scope of the present invention.

As previously mentioned, when a battery is to be conditioned, i.e. discharge/charged by the Battery Manager, it is first attached to the related one of the aforementioned programming means, or alternatively the programming means are built into the battery. Thereafter, the programming means on the battery is positioned over the face 13 of Battery Manager 10. In so doing, the programming means is positioned complementary with the aforementioned reading means. The reading means reads the signature of the battery from the programming means, and the manager circuitry deciphers the coded signature and begins the discharge/recharge cycle according to preset parameters for the specific class or type of battery.

While the invention has been described with reference to specific embodiments, modifications and variations of the invention may be constructed without departing from the scope of the invention, which is defined in the following claims.

We claim:

1. A battery conditioner comprises a plurality of differing programming means representing a plurality of batteries of differing characterisitcs, the programming means including a signature tailored to the characteristics of each of the batteries for automatically programming the battery conditioner to supply to the batteries individually programmed optimal levels of charge; an attaching means for attaching the programming means to the batteries to match each of the batteries with each of the programming means tailored to the characteristics of each of the respective batteries; a housing for individually receiving each of the batteries and attached programming means, the housing including electrical circuits for discharging and recharging the batteries; a sensing means associated with the housing for sensing the presence of one of the programming means; an electrical connection between battery terminals and the housing; and control means including the sensing means and the electrical connection for recognizing the signature of said one of the programming means and discharging the respective battery to a voltage level tailored to the voltage characteristics of the respective battery and then automatically recharging the respective battery to a predetermined programmed level according to said one of the programming means.

2. The apparatus of claim 1, wherein the programming means is an optical signature and the sensing means is an optical reader.

3. The apparatus of claim 2, wherein the optical signature is a bar code and the optical reader is a bar code reader.

4. The apparatus of claim 1, wherein the programming means is an information-bearing magnetic strip, and the sensing means is a magnetic strip reader.

5. The apparatus of claim 1, wherein the programming means is an electrical component specifically providing a signature for a particular type of battery and the sensing means is an electrical sensing device for reading specific characteristics of the electrical component.

6. The apparatus of claim 5, wherein the electrical component is an internal resistor and the electrical reader measures a specific voltage drop through the resistor.

7. The apparatus of claim 6, further comprising at least one additional battery terminal connected to the resistor and complementary sensing battery pins connected to the sensing means for measuring the voltage drop within the resistor, wherein the resistor presents the specific voltage drop which is a signature to the type of battery being conditioned.

8. The apparatus of claim 7, further comprising an A-D converter provided within the conditioner for converting the voltage drop through the resistor to digital data for supplying information to the conditioner to identify the type of battery being specified by the programming means.

9. The apparatus of claim 1, wherein the programming means is a built-in wired code of parameters specific to a type of battery, and the sensing means are contacts provided complementary to the wired code for reading the specific type of battery.

10. The apparatus of claim 9, further comprising the wired code incorporating a plurality of contacts being either grounded or ungrounded according to the signature of the battery and the sensing means and the control means recognizing a pattern of said grounded or ungrounded contacts in association with the type of battery being conditioned.

11. The apparatus of claim 1, wherein the electrical circuits for discharging and recharging of batteries establish a selected predetermined group of different discrete charging levels.

12. The apparatus of claim 11, wherein the discrete charging levels are each constant current.

13. The apparatus of claim 11, wherein the programming means automatically selects a predetermined one of the discrete charging levels.

14. A battery conditioner according to claim 12, in which the programming means automatically selects a predetermined one of the constant current charging levels.

15. The apparatus of claim 1, wherein the attaching means is an adhesive-backed metal plate.

16. The apparatus of claim 1, wherein the attachment means is a permanent attachment between the battery and the programming means which is provided during manufacture.

17. The apparatus of claim 1, wherein the sensing means senses the presence of one of the programming means by making electrical contact with one of the programming means.

18. The apparatus of claim 1, wherein the housing includes on the exterior thereof at least two rails for receiving and holding the respective battery in contact with the conditioner.

19. The apparatus of claim 1, wherein the control means is activated to initiate discharging and recharging only after a predetermined delay following the sensing of the presence of one of the programming means.

20. A method of conditioning a battery comprising providing a plurality of differing programming means representing a plurality of batteries of differing characteristics, the programming means including a specific signature tailored to the characteristics of each specific type of the batteries, respectively, providing a battery conditioner with a sensing means complementary to the programming means for reading the signature of the battery, identifying characteristics of the type of the battery and automatically programming the battery conditioner to condition the battery according to the characteristics of the type of the battery and for supplying to the batteries individually programmed optimal levels of charge; matching each of the batteries with each of the programming means tailored to the characteristics of each of the respective batteries by attaching the programming means to the batteries; individually receiving each of the batteries and attach programming means in a housing including electrical circuits for discharging and recharging the batteries; sensing the presence of one of the programming means by a sensing means associated with the housing; recognizing the signature of said one of the programming means and discharging the respective battery to a voltage level tailored to the voltage characteristics of the respective battery and then automatically recharging the respective battery to a predetermined programmed level according to said one of the programming means by having an electrical connection between battery terminals and the housing and by having a control means including the sensing means and the electrical connection.

21. The method of claim 20, wherein the programming means is an optical signature and the sensing means is an optical reader.

22. The method of claim 21, wherein the optical signature is a bar code and the optical reader is a bar code reader.

23. The method of claim 20, wherein the programming means is an information-bearing magnetic strip, and the sensing means is a magnetic strip reader.

24. The method of claim 20, wherein the programming means is an electrical component specifically providing a signature for a particular type of battery and the sensing means are electrical sensing devices for reading specific characteristics of the electrical component.

25. The method of claim 24, wherein the electrical component is an internal resistor and the electrical sensing device measures a specific voltage drop through the internal resistor.

26. The method of claim 25, further comprising providing at least one additional battery terminal connected to the internal resistor and complementary sensing battery pins connected to the sensing means for measuring the voltage drop within the resistor, wherein the resistor presents the specific voltage drop which is a signature to the type of battery being conditioned.

27. The method of claim 26, further comprising providing an A-D converter provided within the conditioner circuitry for converting the voltage drop through the resistor to digital data for supplying information to the conditioner circuitry to identify the type of battery being specified by the programming means.

28. The method of claim 20, wherein the programming means is a built-in wired code of diameters specific to the type of battery, and the sensing means are contacts provided complementary to the code for reading the specific type of battery.

29. The method of claim 28, further comprising incorporating within the wired code a plurality of contacts being either grounded or ungrounded according to the specific signature of the battery and the sensing means recognizing a pattern of said grounded or ungrounded contacts in association with the type of battery being conditioned.

30. The method of claim 20, the step of conditioning the battery according to the characteristics further includes discharging the battery until the electrical potential at the terminals of the battery is equal to or less than a predetermined level.

31. The method of claim 20, wherein the step of conditioning the battery according to the characteristics further includes charging the battery at a predetermined constant current level during a predetermined period of time.

32. The method of claim 20, wherein the step of conditioning the battery according to the electrical characteristics further includes discharging the battery until the electrical potential at the terminals of the battery is equal to or less than a predetermined level; and charging the battery at a predetermined constant current level during a predetermined period of time.

* * * * *